PULSE GENERATORS

Filed May 1, 1968

Inventors:
Philip John Fitz
Trevor Howard Robinson
and
Alan William Cameron
BY
Baldwin Wight Diller & Brown
ATTORNEYS United States Patent Office 3,512,007
Patented May 12, 1970

3,512,007

PULSE GENERATORS

Philip John Fitz, Trevor Howard Robinson, and Alan William Cameron, Chelmsford, Essex, England, assignors to The Marconi Company Limited, London, England, a British company Filed May 1, 1968, Ser. No. 725,624
Claims priority, application Great Britain, June 19, 1967, 28,198/67
Int. Cl. H03k 3/82
U.S. Cl. 307—88 7 Claims

ABSTRACT OF THE DISCLOSURE

In a triggerable pulse generator, suitable for use with pulse modulating oscillators there are two energy storing devices or networks. One of these is in a series circuit with a saturable reactor and a triggerable switch, e.g. a thyristor, and there is an operating potential source which can be connected across this series circuit. The second energy storing device or network is connected in a branch circuit which is in effective parallel with a part of the series circuit which includes the thyristor but does not include the first energy storing device or network.

This invention relates to triggerable pulse generators suitable for use for pulse modulating oscillators such as magnetron oscillators and in other cases in which output pulses are required to be produced in response to input trigger pulses. More specifically the invention relates to pulse generators of the kind employing a saturable reactor in combination with a semi-conductor device, known as a thyristor, which is used as a triggered switch in the circuit of the saturable reactor. For the sake of brevity pulse generators of this kind will hereinafter be referred to as saturable reactor thyristor switched pulse generators.

Figure 1:
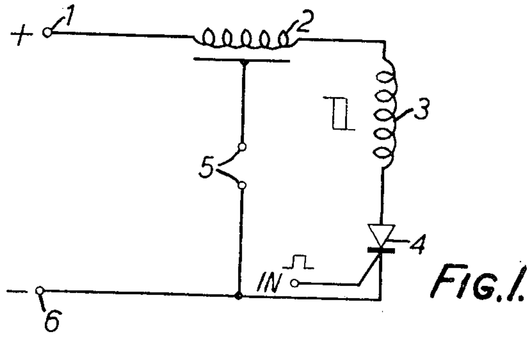
Figure 2:
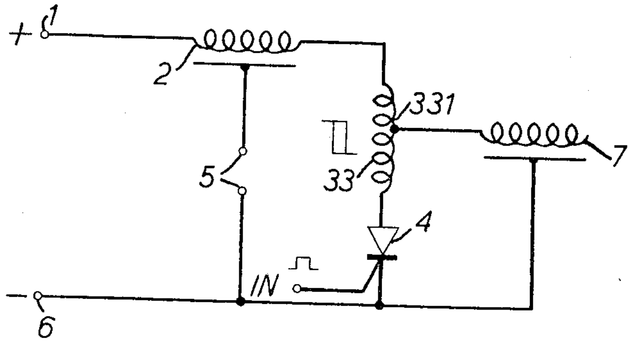
Figure 3:
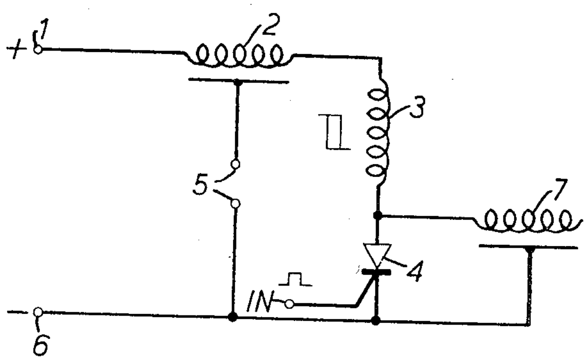
Figure 4:
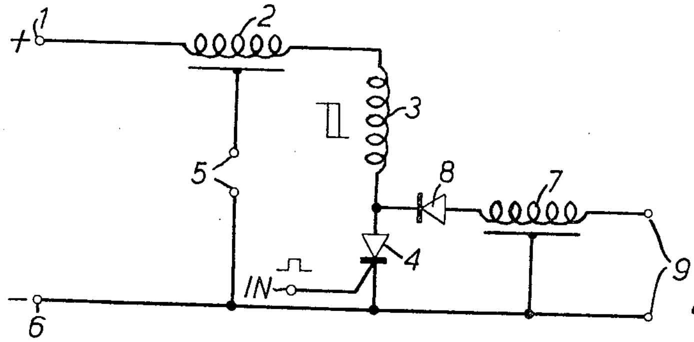

The invention is illustrated in and explained in connection with the accompanying drawings in which FIG. 1, which is provided for purposes of explanation, shows diagrammatically a typical known saturable reactor thyristor switched pulse generator and FIGS. 2, 3 and 4 are diagrams of embodiments of this invention. Like references denote like parts in the figures.

Referring to FIG. 1 potential from a D.C. source (not shown) is applied from terminal 1 through a series circuit including a energy storing network or device 2, a saturable reactor 3 and a triggerable switch constituted by a thyristor 4. The network or device 2 may take any convenient form known per se. Preferably, and as shown in conventional manner in FIG. 1, it consists of a series inductance and shunt distributed capacitances which, in effect, connect an infinite number of different points on the inductance to a common connector. The load (not shown) is connected to terminals 5 one of which is connected to said common connector and the other of which is connected to the remaining terminal 6 of the D.C. source. Triggering input pulses are applied to the gate electrode of the thyristor from the terminal IN. The saturable reactor is preferably an inductance having a core with a substantially rectangular hysteresis loop.

In operation, in the generator of FIG. 1, the reactor 3 holds off the voltage on the device or network 2 for a short time during which a small magnetising current for the reactor 3 flows through the thyristor 4. This small current through the thyristor permits the current-carrying area of the semi-conductor to spread and when a sufficiently large current conducting area is present the reactor 3 becomes saturated and the much larger current discharge from the device or network 2 into the load connected between the terminals 5 is passed.

This known arrangement has two main defects. One, which is present when the output pulse which is required is a pulse of low energy content, is that the energy stored in the device or network 2 is insufficient to magnetise the reactor 3 to saturation. The arrangement is thus undesirably limited in terms of pulse energy in the lower energy range and will not produce really low energy output pulses. The other defect which is present when the pulse which is required is a pulse of high energy content, is that, because the necessary energy to provide the priming current for the thyristor has to be provided from the device or network 2, the arrangement is undesirably limited in terms of pulse energy in the higher energy range and will not produce really high power output pulses of the desired shape and with desirably good efficiency. The present invention seeks to avoid these defects and limitations.

According to this invention a saturable reactor thyristor switched pulse generator comprises a first energy storing device or network in a series circuit which includes also a saturable reactor and a triggerable switch constituted by a thyristor; means for connecting an operating potential source across said series circuit; and a second energy storing device or network connected in a branch circuit which is in effective parallel with a part only of said series circuit, said part including at least the thyristor but not including said first energy storing device or network.

In the case in which low energy output pulses are required said saturable reactor is constituted by a transformer and said branch circuit is in effective parallel with a part of the series circuit comprising one winding of the transformer and the thyristor. The transformer is preferably an auto transformer having one winding constituted by a portion of the other winding.

In the case in which high energy output pulses are required the branch circuit is in parallel with that part of the series circuit which includes only the thyristor. In this case the branch circuit preferably includes a hold-off diode in series therein and means are provided for charging the energy storing device or network in said branch circuit from a source of relatively low potential.

Preferably in all cases the reactor has a core with a substantially rectangular hysteresis loop.

Preferably, also, in all cases, the energy storing device or network in the branch circuit consists of a series inductance and shunt distributed capacitances which, in effect, connect points distributed along the inductance to a common connector.

FIG. 2 shows an embodiment of the invention adapted to produce low energy output pulses. As will be seen there are two differences between FIGS. 1 and 2 one being that the saturable reactor, which, as before, has a core with a rectangular hysteresis loop, is formed as an auto-transformer and the second being the provision of a second energy storing device or network. The saturable reactor, here referenced 33, has its whole winding in the series circuit which also includes the device or network 2 and the thyristor 4. This winding has a tap 331, the second winding of the auto-transformer being the portion between the tap 331 and the thyristor. Connected across this second winding or portion is a branch circuit including a second energy storing device or network 7 which may be similar to the device or network 2. The load terminals 5 are as in FIG. 1.

The whole arrangement is such that when the thyristor is triggered the network 7 starts to discharge and the voltage produced by the step-up ratio of the transformer-reactor 33 holds off the voltage on the device or network 2. This step-up ratio can be arranged to increase the charge in the device or network 2 above the voltage at which the thyristor would break down, the extra charge on said device or network 2 being dimensioned to overcome circuit losses. When the reactor 33 saturates, the residue of the charge in the second device or network 7 discharges and substantially all the energy in the first device or network 2 is transferred to the load.

In the modification shown in FIG. 3, which is suitable for the production of high power output pulses, the saturable reactor 3 is as in FIG. 1 and the branch circuit including the second storage device or network 7 is connected across the thyristor 4. This device or network accordingly provides the necessary priming current for the thyristor and therefore allows high power output pulses to be generated.

In a preferred modification of FIG. 3 shown in FIG. 4, a hold-off diode 8 is connected between the junction point of the elements 3 and 4 and the adjacent end of the device or network 7. The provision of this diode enables the device or network 7 to be charged from an independent low voltage supply (not shown) which is connected between terminals 9 and is considerably lower than the voltage applied between terminals 1 and 6, thus reducing the energy requirement for priming the thyristor 4.

We claim:

1. A saturable reactor thyristor switched pulse generator comprising a first energy storing device or network in a series circuit which includes also a saturable reactor and a triggerable switch constituted by a thyristor; means for connecting an operating potential source across said series circuit; and a second energy storing device or network connected in a branch circuit which is in effective parallel with a part only of said series circuit, said part including at least the thyristor but not including said first energy storing device or network.

2. A generator in accordance with claim 1 and which is adapted to provide low energy output pulses wherein said saturable reactor is constituted by a transformer and said branch circuit is in effective parallel with a part of the series circuit comprising one winding of the transformer and the thyristor.

3. A generator in accordance with claim 1 and which is adapted to provide high energy output pulses wherein the branch circuit is in parallel with that part of the series circuit which includes only the thyristor.

4. A generator as claimed in claim 2 wherein the transformer is an auto transformer having one winding constituted by a portion of the other winding.

5. A generator as claimed in claim 3 wherein the branch circuit includes a hold-off diode in series therein and means are provided for charging the energy storing device or network in said branch circuit from a source of relatively low potential.

6. A generator as claimed in claim 1 wherein the reactor has a core with a substantially rectangular hysteresis loop.

7. A generator as claimed in claim 1 wherein the energy storing device or network in the branch circuit consists of a series inductance and shunt distributed capacitances which, in effect, connect points distributed along the inductance to a common connector.

References Cited

UNITED STATES PATENTS

| | | | |
|---|---|---|---|
| Re. 26,027 | 5/1966 | Manteuffel | 307—282 X |
| 2,990,539 | 6/1961 | Mackay et al. | 307—88 X |
| 3,244,904 | 4/1966 | Schwartz | 307—282 X |
| 3,432,679 | 3/1969 | O'Brien | 307—88 |
| 3,432,682 | 3/1969 | Husa | 307—88 |

STANLEY M. URYNOWICZ, Jr., Primary Examiner

U.S. Cl. X.R.

307—282